(12) United States Patent
Zaltsman et al.

(10) Patent No.: US 9,535,628 B2
(45) Date of Patent: Jan. 3, 2017

(54) MEMORY SYSTEM WITH SHARED FILE SYSTEM

(71) Applicant: Apple Inc., Cupertino, CA (US)

(72) Inventors: Etai Zaltsman, Ramat-Hasaron (IL); Sasha Paley, Kfar-Saba (IL); Avraham Poza Meir, Rishon Le-Zion (IL)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 14/050,737

(22) Filed: Oct. 10, 2013

(65) Prior Publication Data

US 2015/0106410 A1 Apr. 16, 2015

(51) Int. Cl.
| | |
|---|---|
| *G06F 12/02* | (2006.01) |
| *G06F 3/06* | (2006.01) |
| *G06F 17/30* | (2006.01) |
| *G06F 12/08* | (2016.01) |

(52) U.S. Cl.
CPC ............ *G06F 3/0659* (2013.01); *G06F 3/061* (2013.01); *G06F 3/0619* (2013.01); *G06F 3/0658* (2013.01); *G06F 3/0661* (2013.01); *G06F 3/0671* (2013.01); *G06F 3/0679* (2013.01); *G06F 12/0246* (2013.01); *G06F 12/0253* (2013.01); *G06F 12/0833* (2013.01); *G06F 17/30218* (2013.01); *G06F 2212/621* (2013.01)

(58) Field of Classification Search
CPC .... G06F 3/0619; G06F 3/0637; G06F 3/0643; G06F 3/0658; G06F 3/0659; G06F 12/0246; G06F 12/0253; G07F 17/30218
See application file for complete search history.

(56) References Cited

U.S. PATENT DOCUMENTS

| | | | |
|---|---|---|---|
| 7,873,782 B2 | 1/2011 | Terry et al. | |
| 8,200,904 B2 | 6/2012 | Lasser | |
| 8,307,161 B2 * | 11/2012 | Aharonov | ............... G06F 21/64 |
| | | | 711/118 |
| 8,392,662 B2 | 3/2013 | Jang et al. | |
| 9,122,579 B2 * | 9/2015 | Flynn | .................. G06F 12/0246 |
| 2003/0065866 A1 * | 4/2003 | Spencer | ................ G06F 3/0613 |
| | | | 710/306 |

(Continued)

FOREIGN PATENT DOCUMENTS

WO 2012109677 8/2012

OTHER PUBLICATIONS

Sai Krishna Mylavarapu et al; "FSAF: File System Aware Flash Translation Layer for NAND Flash Memories"; Design, Automation & Test in Europe Conference & Exhibition; Apr. 2009; pp. 399-404; IEEE; United States.

(Continued)

*Primary Examiner* — Hal Schnee
(74) *Attorney, Agent, or Firm* — Meyertons, Hood, Kivlin, Kowert & Goetzel, P.C.

(57) ABSTRACT

An apparatus includes a non-volatile memory and a processor. The processor is configured to receive, from a host, commands for storage of data in the non-volatile memory, to further receive from the host, for storage in the non-volatile memory, File System (FS) information that specifies organization of the data in a FS of the host, to receive from the host a directive that grants the processor permission and capability to access and modify the FS information, and to access the FS information, using the directive, so as to manage the storage of the data in the non-volatile memory.

20 Claims, 3 Drawing Sheets

(56) References Cited

U.S. PATENT DOCUMENTS

| | | | |
|---|---|---|---|
| 2006/0184719 A1 | 8/2006 | Sinclair | |
| 2007/0005894 A1* | 1/2007 | Dodge | G06F 12/0866 |
| | | | 711/118 |
| 2007/0028067 A1* | 2/2007 | Hinrichs | H04L 63/083 |
| | | | 711/164 |
| 2007/0143532 A1 | 6/2007 | Gorobets et al. | |
| 2007/0143571 A1* | 6/2007 | Sinclair | G06F 3/0605 |
| | | | 711/203 |
| 2008/0112238 A1* | 5/2008 | Kim | G11C 11/5621 |
| | | | 365/200 |
| 2008/0195900 A1* | 8/2008 | Chang | G11C 7/1006 |
| | | | 714/718 |
| 2010/0005225 A1* | 1/2010 | Honda | G06F 3/0607 |
| | | | 711/103 |
| 2010/0180072 A1* | 7/2010 | Kogita | G06F 12/0246 |
| | | | 711/103 |
| 2011/0060887 A1 | 3/2011 | Thatcher et al. | |
| 2011/0072188 A1 | 3/2011 | Oh et al. | |
| 2012/0011340 A1* | 1/2012 | Flynn | G06F 12/0246 |
| | | | 711/171 |
| 2012/0096217 A1 | 4/2012 | Son et al. | |
| 2013/0042054 A1 | 2/2013 | Jung et al. | |
| 2013/0042164 A1* | 2/2013 | Suzuki | G06F 11/1072 |
| | | | 714/773 |
| 2013/0132638 A1 | 5/2013 | Horn | |
| 2013/0262775 A1* | 10/2013 | Asaro | G06F 12/0877 |
| | | | 711/135 |
| 2013/0290618 A1* | 10/2013 | Werner | G06F 11/1044 |
| | | | 711/103 |
| 2015/0074340 A1* | 3/2015 | Criswell | G06F 12/0868 |
| | | | 711/103 |
| 2015/0149690 A1* | 5/2015 | Maeda | H04N 5/907 |
| | | | 711/102 |

OTHER PUBLICATIONS

Xiangyong Ouyang; "Beyond Block I/O: Rethinking Traditional Storage Primitives"; 2011 IEEE 17th International Symposium on High Performance Computer Architecture (HPCA); pp. 301-311; IEEE; United States.

Abhishek Rajimwale et al; "Block Management in Solid-State Devices"; Proceedings of the USENIX Annual Technical Conference (USENIX'09); Jun. 2009; 6 pages; USENIX; United States.

International Search Report and Written Opinion from PCT/US2014/057965, issued Dec. 4, 2014, Apple Inc., pp. 1-12.

Office Action in Roc (Taiwan) Patent Application No. 103134922 issued Nov. 13, 2015.

International Preliminary Report in Application No. PCT/US2014/057965 issued Apr. 21, 2016.

* cited by examiner

MEMORY SYSTEM WITH SHARED FILE SYSTEM

FIELD OF THE INVENTION

The present invention relates generally to data storage, and particularly to methods and systems for storage management in non-volatile memory.

BACKGROUND OF THE INVENTION

Some storage systems comprise a host that runs a File System (FS), and a storage device in which the host stores data. For example, Mylavarapu et al. describe a FS-aware Flash Translation Layer (FTL), in "FSAF: File System Aware Flash Translation Layer for NAND Flash Memories," Design, Automation & Test in Europe Conference & Exhibition, April, 2009, pages 399-404, which is incorporated herein by reference. FSAF monitors write requests to FAT32 table to interpret any deleted data dynamically, subsequently optimizing garbage collection (GC) and wear leveling (WL) algorithms accordingly. Also, depending upon the size of dead content and the Flash utilization, proactive dead data reclamation is carried out.

As another example, Rajimwale et al. describe a division of labor between file systems and storage in "Block Management in Solid-State Devices," Proceedings of the USENIX Annual Technical Conference (USENIX'09), June, 2009, which is incorporated herein by reference. The authors assert that on a hard disk drive (HDD), nearby logical block numbers (LBNs) translate well to physical proximity. However, this technique fails on an SSD. This further motivates the conclusion that the file system accesses should be in terms of objects (or parts of objects) and the SSD should handle the low-level sector-specific scheduling.

As yet another example, in "Beyond Block I/O: Rethinking Traditional Storage Primitives," Proceedings of the IEEE 17th International Symposium on High Performance Computer Architecture (HPCA-17), pages 301-311, which is incorporated herein by reference, Ouyang et al. describe a class of higher order storage primitives beyond simple block I/O that high performance solid state storage should support. One such primitive, atomic-write, batches multiple I/O operations into a single logical group that will be persisted as a whole or rolled back upon failure. By moving write-atomicity down the stack into the storage device, it is possible to reduce the amount of work required at the application, file system, or operating system layers to guarantee the consistency and integrity of data.

U.S. Pat. No. 7,873,782, whose disclosure is incorporated herein by reference, describes a file-system-aware storage system which locates and analyzes host file system data structures in order to determine storage usage of the host file system. To this end, the storage system might locate an operating system partition, parse the operating system partition to locate its data structures, and parse the operating system data structures to locate the host file system data structures. The storage system manages data storage based on the storage usage of the host file system. The storage system can use the storage usage information to identify storage areas that are no longer being used by the host file system and reclaim those areas for additional data storage capacity. Also, the storage system can identify the types of data stored by the host file system and manage data storage based on the data types, such as selecting a storage layout and/or an encoding scheme for the data based on the data type.

SUMMARY OF THE INVENTION

An embodiment of the present invention provides an apparatus, including a non-volatile memory and a processor. The processor is configured to receive from a host commands for storage of data in the non-volatile memory, to further receive from the host, for storage in the non-volatile memory, File System (FS) information that specifies organization of the data in a FS of the host, to receive from the host a directive that grants the processor permission and capability to access and modify the FS information, and to access the FS information, using the directive, so as to manage the storage of the data in the non-volatile memory.

In some embodiments, the FS of the host stores the data using Logical Block Addresses (LBA) in a logical address space of the FS, the FS information includes usage information indicating which of the LBAs are used for storing valid data, and the processor is configured to access the usage information. In other embodiments, the processor is configured to allocate one or more of the LBAs in the logical address space, and to modify the usage information in the FS information to indicate the allocated LBAs. In yet other embodiments, the processor is configured to de-allocate one or more of the LBAs in the logical address space, and to modify the usage information in the FS information to indicate the de-allocated LBAs.

In an embodiment, the apparatus further includes a volatile memory for caching the received data, and the cached data includes one or more data groups, and the processor is configured to store the data by selecting one or more of the cached data groups using the FS information, and flushing only the selected data groups from the volatile memory to the non-volatile memory. In another embodiment, the data groups include data related to a specific file, and the processor is configured to select and flush only the data related to the specific file. In yet another embodiment, the data groups include data related to a specific storage command, and the processor is configured to select and flush only the data related to the specific storage command.

In some embodiments, one or more of the data groups are assigned respective storage priorities, and the processor is configured to store the data by identifying, using the FS information, the assigned data groups and the respective priorities, and flushing the identified data groups according to the priorities. In other embodiments, the processor is configured to respond to each of the received commands by performing a respective storage operation, to modify the FS information while performing the storage operation, and to send a conclusion message to the host upon concluding to perform the storage operation. In yet other embodiments, the data includes first and second data groups, the first data group has a first storage significance and the second data group has a second storage significance which is lower than the first storage significance, and the processor is configured to manage the storage of the data by storing the first and second data groups with respective first and second storage reliability levels, the second reliability level beeing lower than the first reliability level.

In an embodiment, the processor is configured to receive the commands with Logical Block Addresses (LBAs), to associate the LBAs with respective physical addresses of the non-volatile memory in which the data is stored, and to update a previously stored file with new data by storing the new data in one or more new physical addresses, and re-associating the LBAs of the new data with the new physical addresses only after all the new data is written. In another embodiment, the processor is configured to retrieve from the FS information, upon failing to read at least part of a given file, one or more addresses of a backup copy of the given file, and to read at least the part from the backup copy using the addresses.

There is additionally provided, in accordance with an embodiment of the present invention, a method including, in a storage device, receiving from a host commands for storage of data in a non-volatile memory, receiving in the storage device from the host, for storage in the non-volatile memory, File System (FS) information that specifies organization of the data in a FS of the host, receiving in the storage device from the host a directive that grants the storage device permission and capability to access and modify the FS information, and accessing the FS information by the storage device, using the directive, so as to manage the storage of the data in the non-volatile memory.

There is additionally provided, in accordance with an embodiment of the present invention, apparatus including a host and a storage device, which includes a non-volatile memory. The host is configured to run a File System (FS) for storing data. The storage device is configured to receive from the host commands for storage of the data in the non-volatile memory, to further receive from the host, for storage in the non-volatile memory, File System (FS) information that specifies organization of the data in the FS of the host, to receive from the host a directive that grants the storage device permission and capability to access and modify the FS information, and to access the FS information, using the directive, so as to manage the storage of the data in the non-volatile memory.

The present invention will be more fully understood from the following detailed description of the embodiments thereof, taken together with the drawings in which:

DETAILED DESCRIPTION OF EMBODIMENTS

Overview

Figure 1:
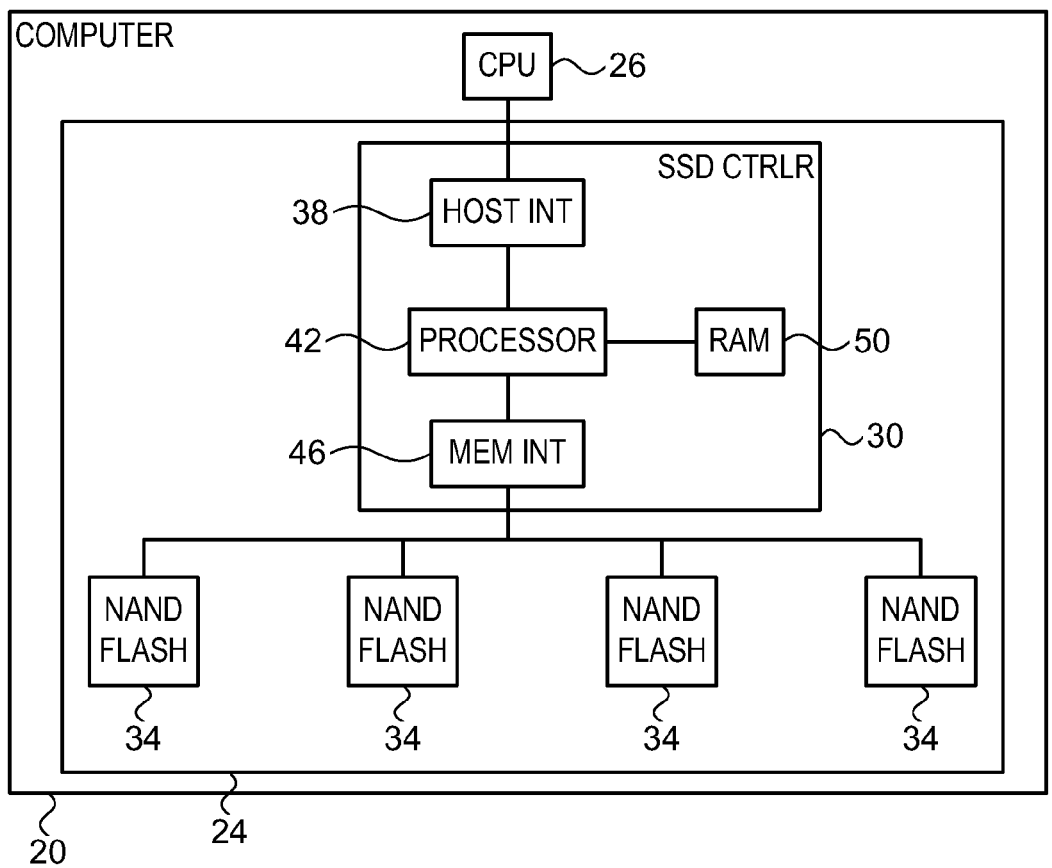
FIG. 1 is a block diagram that schematically illustrates a memory system, in accordance with an embodiment of the present invention.

Embodiments of the present invention that are described herein provide improved methods and systems for data storage in a non-volatile memory. In the disclosed embodiments, a host runs a File System (FS) to store data organized in files in a Solid state disk (SSD). The SSD comprises an SSD controller and one or more Flash memory devices.

The FS of the host typically stores and manages one or more FS data structures, also referred to as FS information, in the Flash devices. The FS information specifies organization of the data in the FS of the host. For example, the FS information may comprise a list of Logical Block Addresses (LBAs), wherein LBAs that are allocated (or not) for storing valid data are marked with a respective indication. In some disclosed embodiments, the host grants the SSD controller permission and capabilities to access and modify the FS information.

Several embodiments are described, in which allowing the SSD controller explicit permission to access and modify the FS information results in advantageous implementation. In an example embodiment, when the host deletes a file, the SSD controller becomes immediately aware of the deleted LBAs. Therefore, the host is relieved of the need to free the LBAs of the deleted file in the SSD (e.g., eliminates the need for a TRIM command, which is typically much longer than a delete command).

In another embodiment, when the host stores a new file in the SSD or adds data to an existing file, the disclosed technique enables the SSD controller (instead of the host) to choose which LBAs are to be allocated to the data. Since the SSD controller handles both the logical and the physical address spaces, the SSD controller can optimally allocate logical and physical addresses to minimize fragmentation in both spaces. By reducing storage space fragmentation, the SSD can utilize the storage space more efficiently and with reduced latency.

In some embodiments, the SSD further comprises a volatile memory, usually a Random Access Memory (RAM). In an embodiment, the host sends to the SSD controller a command to flush a certain file or part of a file, or data relating to a particular storage command (e.g., thread or tag) from the RAM to the Flash devices. This capability, as opposed to non-selective flushing of the entire content of the RAM, enables quick and efficient reaction to imminent power shut-down.

As another example, in some embodiments cached data in the RAM comprises multiple data groups which are assigned different storage priorities. For example, on power down event, a data group comprising FS information should be flushed from the RAM to the Flash devices prior to flushing file data. By identifying, using the FS information, data groups and respective storage priorities in the RAM, the SSD controller can flush identified data groups according to the respective priorities.

In some embodiments, data stored in the Flash devices, or cached in the RAM, comprises data groups of different storage significance. For example, since the integrity and consistency of the FS information structure is critical for proper operation of the storage device, a data group that comprises the FS information or a section thereof should typically be stored with higher reliability than file data. Using access capabilities to the FS information, the SSD controller can identify stored data groups having higher significance and store such groups in Flash devices that provide higher reliability and/or reduced latency, for example using a small number of bits per cell and/or a stronger Error Correcting Code (ECC).

In some embodiments, the SSD controller uses the ability to access the FS information to enable recovery from a failure that may occur during updating a previously stored file. The original data of the file is assumed to be stored in physical addresses of the non-volatile memory, which are associated with respective LBAs in the logical address space of the FS. The SSD controller accepts from the host a file update command, which includes the new data and respective LBAs (in the same LBA range that was used for storing the original data). The SSD controller first writes all the new data to newly allocated physical addresses, and only then associates the LBAs of the new data with the new physical addresses. Then, the SSD controller writes in the FS information an indication that marks the file as successfully updated. Since the SSD controller retains the association between the original logical and physical addresses until the new data is fully written, a failure (e.g., created by power shut down) that may occur during the update operation does not corrupt the original file.

In an example embodiment, the FS stores a given file along with one or more backup copies of the file. The FS or the SSD controller associates, in the FS information, between the LBAs of the given file and the LBAs of its backup copies. If the SSD controller fails in reading at least part of the given file, the SSD controller accesses the FS information to retrieve the LBAs of a respective backup copy and reads at least the failed part of the data from the backup copy, transparently to the FS.

System Description

FIG. 1 is a block diagram that schematically illustrates a memory system, in accordance with an embodiment of the present invention. In the present example, the memory system comprises a computer 20 that stores data in a Solid state Drive (SSD) 24. Computer 20 may comprise, for example, a mobile, tablet or personal computer. The computer comprises a Central Processing Unit (CPU) 26 that serves as a host. In the description that follows, the terms CPU and host are used interchangeably.

In alternative embodiments, the host may comprise any other suitable processor or controller, and the storage device may comprise any other suitable device. For example, the host may comprise a storage controller of an enterprise storage system, and the storage device may comprise an SSD or an array of SSDs. Other examples of hosts that store data in non-volatile storage devices comprise mobile phones, digital cameras, media players and removable memory cards or devices.

SSD 24 stores data for CPU 26 in a non-volatile memory, in the present example in one or more NAND Flash memory devices 34. In alternative embodiments, the non-volatile memory in SSD 24 may comprise any other suitable type of non-volatile memory, such as, for example, NOR Flash, Charge Trap Flash (CTF), Phase Change RAM (PRAM), Magnetoresistive RAM (MRAM) or Ferroelectric RAM (FeRAM).

An SSD controller 30 performs the various storage and management tasks of the SSD. The SSD controller is also referred to generally as a memory controller. SSD controller 30 comprises a host interface 38 for communicating with CPU 26, a memory interface 46 for communicating with Flash devices 34, and a processor 42 that carries out the various processing tasks of the SSD.

SSD 24 further comprises a volatile memory, in the present example a Random Access Memory (RAM) 50. In the embodiment of FIG. 1, RAM 50 is shown as part of SSD controller 30, although the RAM may alternatively be separate from the SSD controller. RAM 50 may comprise, for example, a Static RAM (SRAM), a Dynamic RAM (DRAM), a combination of the two RAM types, or any other suitable type of volatile memory.

In some embodiments, accessing RAM 50 is faster than accessing Flash devices 34. In such embodiments, CPU 26 and/or processor 42 may store in RAM 50 data that should be accessed with minimal latency. Data stored in RAM 50 may comprise data received from host 26 and not yet delivered for storage in Flash devices 34. Additionally or alternatively, data stored in RAM 50 may comprise data that was already stored in Flash devices 34 and cached back in RAM 50.

SSD controller 30, and in particular processor 42, may be implemented in hardware. Alternatively, the SSD controller may comprise a microprocessor that runs suitable software, or a combination of hardware and software elements.

The configuration of FIG. 1 is an exemplary configuration, which is shown purely for the sake of conceptual clarity. Any other suitable SSD or other memory system configuration can also be used. Elements that are not necessary for understanding the principles of the present invention, such as various interfaces, addressing circuits, timing and sequencing circuits and debugging circuits, have been omitted from the figure for clarity. In some applications, e.g., non-SSD applications, the functions of SSD controller 30 are carried out by a suitable memory controller.

In the exemplary system configuration shown in FIG. 1, memory devices 34 and SSD controller 30 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 34 are disposed. Further alternatively, some or all of the functionality of SSD controller 30 can be implemented in software and carried out by CPU 26 or other processor in the computer. In some embodiments, CPU 26 and SSD controller 30 may be fabricated on the same die, or on separate dies in the same device package.

In some embodiments, processor 42 and/or CPU 26 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

CPU 26 of computer 20 typically runs a File System (FS 64 in FIG. 2 below), which stores one or more files in SSD 24. The FS stores the files in the SSD using a logical addressing scheme. In such a scheme, the FS assigns each file a group of one or more logical addresses (also referred to as Logical Block Addresses—LBAs), and sends the file data to SSD 24 for storage in accordance with the LBAs.

Processor 42 of SSD controller 30 typically maintains a logical-to-physical address translation, which associates the logical addresses specified by the host with respective physical storage locations (also referred to as physical addresses) in Flash devices 34, and stores the data in the appropriate physical storage locations. The logical-to-physical address translation (also referred to as Virtual-to-Physical mapping—V2P) may be stored in RAM 50, in Flash devices 34, or in both.

Shared FS with Modification Permission

Figure 2:
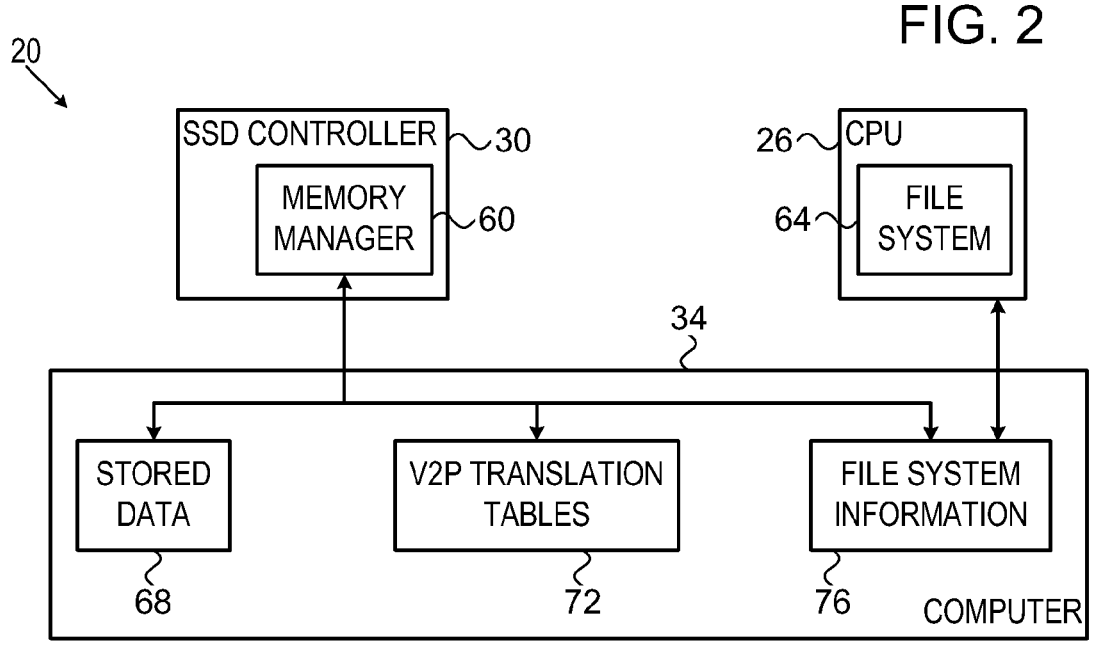
FIG. 2 is a diagram showing data flow among storage and control modules in a memory system, in accordance with an embodiment of the present invention.

FIG. 2 is a diagram showing data flow among storage and control modules in memory system 20, in accordance with an embodiment of the present invention. In the example shown in FIG. 2, CPU 26 runs FS 64 to handle the storage of files, and SSD controller 30 runs a memory manager program 60 to handle the storage of data in Flash devices 34. The File Translate Layer (FTL), noted above, is an example of such a memory manager program. In order to manage the storage of files, CPU 26 via FS 64 stores and manages one or more data structures that are collectively referred to as FS information 76. In the example of FIG. 2, CPU 26 stores FS information 76 in Flash devices 34. In an example embodiment, FS information 76 comprises a data structure (e.g., bit-map) that specifies which of the LBAs in the logical address space of FS 64 are actually used for storing valid data. In alternative embodiments, at least some of FS information 76 may be stored in RAM 50. For example, when FS 64 stores, deletes, or updates a certain file, parts of FS information 76 that correspond to the storage of that file may be cached in RAM 50 to reduce access latencies.

As described above, FS 64 stores files using a logical addressing scheme (i.e., LBAs). For example, FS information 76 may comprise, per file, a list of the respective LBAs allocated for storing that file. Memory manager 60 in SSD controller 30 maintains Virtual-to-Physical (V2P) tables 72 that associates LBAs with physical storage locations in Flash devices 34. In the embodiment of FIG. 2, SSD controller 30 stores the actual file data in a stored data area 68.

In embodiments that are disclosed below, host 26 sends to the SSD controller a directive to grant the SSD controller permission and capability to access and modify FS information 76. Sharing FS information 76 between SSD controller 30 and FS 64 with explicit modification permission to the SSD controller is advantageous as described in example embodiments further below.

The granting directive sent by the host may comprise, for example, the location in memory of the FS information and formatting information to enable SSD controller 30 to parse the FS information. The formatting information may comprise the type of the Operating System (OS) which runs the FS and/or the type of the FS itself. In alternative embodiments, any other suitable granting directive configuration may be used.

In some cases, SSD controller 30 is able to reconstruct a mirror structure of FS information 76 or parts thereof. For example, SSD controller 30 can scan memory devices 34 to identify parts of the FS information, or monitor host interface 38 to intercept storage operations executed by CPU 26 while running FS 64 in order to build a mirror structure of FS information 76. Note however, that without explicit permission from CPU 26 to access FS information 76, SSD controller 30 is not allowed to modify any of the FS information. Therefore, reconstructing FS information 76 independently from CPU 26 may enable SSD controller 30 to access FS information 76 only for reading, but not for modification. Moreover, scanning the memory or monitoring storage operations in order to create a mirror structure of the FS information poses significant processing overhead on SSD controller 30.

Example Embodiments With Shared Fs Information

We now describe several example embodiments of memory system 20, wherein host 26 grants SSD controller (using any suitable granting directive) permission to access and modify FS information 76. Host 26 can send the granting directive when the FS initially builds up and stores FS information 76. Additionally or alternatively, host 26 can send the granting directive periodically, along with or as part of storage commands, upon certain modifications in the FS information, or on any other suitable occasion.

Assume now that system 20 is required to delete a file that was previously stored using FS 64. Since the file was stored using FS 64, FS information 76 as well as V2P tables 72 specify respective LBAs that were allocated for storing that file. In order to delete the file, system 20 should remove the corresponding LBAs from both FS information 76 and V2P tables 72 so that the removed LBAs can be used for storing other data. To remove an LBA from the FS information, the SSD controller marks the LBA in the FS data structure as an unused LBA.

In principle, host 26 can remove the file LBAs from FS information 76, and send to SSD controller 30 a TRIM command listing these LBAs as LBAs to be removed from V2P tables 72. Since over time, the logical address space handled by FS 64 often becomes fragmented, LBAs allocated to a certain file typically do not form a contiguous range of addresses in the logical address space and the respective TRIM command may comprise a long list of LBAs, therefore imposing significant communication overhead on host interface 38. Moreover, by using a TRIM command, both host 26 and SSD controller 30, need to manage LBAs when deleting a file.

In an example embodiment, the host grants the SSD controller permission to access and modify the FS information, host 26 sends to the SSD controller only a handle in the FS data structure to access the file to be deleted instead of sending a full list of LBAs. The handle may comprise, for example, access information to only the first LBA in the list. SSD controller 30 accesses the full LBAs list by parsing the FS information, removes the respective LBAs from FS information 76 and from V2P tables 72, and informs the host when deletion is completed. Thus, the disclosed embodiment is advantageous over using TRIM commands since communication overhead of sending TRIM commands comprising long lists of LBAs is reduced. Moreover, the host is freed from the task of removing LBAs from FS information 76.

Consider an embodiment in which host 26 is required to store a new file or to update an already stored file in the SSD. When storing a new file, system 20 should allocate for the new file LBAs in the logical address space, and respective physical addresses in Flash devices 34. When updating a stored file, system 20 should similarly allocate storage space when new data is added to the file, or de-allocate storage space when data is removed from the file. When storage space is highly fragmented, storing or updating files in the SSD may additionally involve re-allocation of logical and/or physical addresses. In some embodiments, host 26 handles the logical address space, and SSD controller 30 independently handles the physical address space. Since over time both the logical and the physical address spaces may get fragmented, the efficiency of the storage system in such embodiments degrades considerably.

In an embodiment, LBA allocation in FS information 76 for storing a new or updated file is performed by SSD controller 30, rather than by host 26. Since the SSD controller and the host share the FS information, the host becomes immediately aware of the LBA allocation. Hybrid implementations, in which LBA allocation can be performed either by the host or by the SSD controller, are also feasible. For example, in an embodiment, the LBAs of fundamental FS information, such as, for example, the file directory and the file allocation tables (FAT), is determined only by the host, whereas the allocation of LBAs for storage of user files is carried out by the SSD controller.

Since in the disclosed embodiment SSD controller 30 handles both the logical and physical address spaces it can jointly allocate logical and physical addresses to minimize fragmentation in both spaces. For example, SSD controller 30 can scan the physical address space to find a contiguous storage area in one or more of Flash devices that fits the size of the new file, and allocate respective contiguous range of LBAs in FS information 76. As another example, SSD controller 30 can first allocate a contiguous range of LBAs in FS information 76, and then allocate respective contiguous storage spaces in multiple Flash devices 34 to enable parallel access to multiple parts of the file. Methods for joint logical and physical addresses allocation are described, for example, in U.S. patent application Ser. No. 13/720,024, filed Dec. 19, 2012, whose disclosure is incorporated herein by reference.

In some embodiments, SSD controller 30 manages the storage of data in Flash devices 34, but is unaware of data items that may be more significant or sensitive than others. In a disclosed embodiment, it is desirable to distinguish between data of different storage significance. For example, since even a single error in FS information 76 can result in major damage to the FS and loss of access to large (or even all) storage areas, FS information 76 should typically be stored with higher reliability than file data.

As SSD controller 30 has permission to access/modify FS information 76, the SSD controller can store FS information 76 or parts thereof using a smaller number of bits per cell (e.g., using a Single-Level Cell (SLC) configuration rather than a Multi-Level Cell (MLC) configuration) to increase storage reliability and reduce access latency. Additionally or alternatively, SSD controller 30 can store and protect FS information 76 using an Error Correcting Code (ECC) which has higher error correction capabilities than an ECC used for the file data.

The directive sent by host 26 to grant SSD controller 30 permission to access/modify FS information 76, or possibly a separate dedicated directive per stored data, may comprise a significance level indicator. Based on the significance indicator, SSD controller 30 assigns suitable respective storage and protection resources for the respective data. Alternatively or additionally, by accessing the FS information, the SSD controller directly identifies which data is more sensitive, and can decide how to store it In some embodiments, file data 68, FS information 76, or parts thereof are cached in RAM 50. For example, host 26 may cache a file to be updated, together with respective parts of FS information 76 for fast access. SSD controller 30 typically flushes the content of RAM 50 to Flash devices 34 upon receiving a flush request, for example when system 20 recognizes or initiates an approaching power down event. Additionally or alternatively, a flush request can be originated by host 26, SSD controller 30, or both. Further additionally or alternatively, a flush request may be issued periodically or on any other suitable occasion.

In a disclosed embodiment, SSD controller 30 uses the granted permission to access and modify FS information 76 to flush only selected data groups out of the data cached in RAM 50. A cached data group may comprise, for example, file data, an updated section of file data, or a section of FS information 76. Different data groups cached in RAM 50 may be assigned different storage priorities. For example, since the integrity and consistency of FS information 76 is critical to the operation of storage system 20, cached sections of FS information 76 should be flushed with the highest priority. Having access to FS information 76, SSD controller 30 can identify cached sections of FS information 76 and flush these sections prior to other cached data.

As another example, an atomic write operation refers to data groups that should be written as a unit or otherwise discarded. In other words, if for some reason flushing the entire data group was not successfully concluded, subsequent storage and/or management operations should be carried out under the assumption that none of the data group was successfully flushed. For example, on power down event, an updated part of FS information 76 should be written as a unit in order to maintain the integrity and consistency of the FS information. Thus, flushing certain data groups as a unit (e.g., a unit of data groups that together comprise a section of the FS information that corresponds to the storage of a certain file) with higher priority improves atomic write operation of the SSD controller and aids to maintain the integrity and consistency of FS information 76.

In some embodiments, SSD controller 30 uses the ability to access the FS information to perform selective flushing operations. In an embodiment, a selective flush command comprises a request to selectively flush the data relating to a specific file, to a specified set of files and/or to sections of files. Similarly, a selective flush command may instruct the SSD to flush the data relating to a specific storage command (e.g., thread or tag, depending on the applicable storage protocol). In some embodiments, selective flushing is superior to conventional flushing of the entire RAM 50 content. For example, on power down event selective flushing enables to flush cached information according to a desirable order.

When the host updates a previously stored file with new data, the host sends a file update or rewrite command to the SSD, which typically includes the new data and respective LBAs. The LBAs are associated with respective physical addresses in which the original data of the file is stored. The SSD controller allocates new physical addresses for the new data and stores the new data in the new physical addresses.

It is possible in principle for the SSD controller to re-associate each LBA with the new respective physical address (i.e., update the logical-to-physical address mapping) as soon as the data of this LBA is stored successfully. If, however, the operation fails before successfully writing all the new data and associating all the LBAs (i.e., the LBAs received with the new data in the update command) with the new physical addresses (for example, if power shut down occurs during the operation), the file in question may become corrupted.

Thus, in some embodiments, system 20 enables safe recovery from failure during file update using a method referred to as "copy-on-write." Upon receiving the rewrite command (including the new data and respective LBAs), the SSD first writes all the new data to newly allocated physical addresses. During this phase, the SSD controller does not re-associate physical with logical addresses, and therefore retains the association between the LBAs and the respective physical addresses of the original data. Only after the new data is fully written successfully, the SSD controller re-associates the LBAs with the new physical addresses. The SSD controller then uses the ability to access the FS information to write in the FS information an indication that marks the file as successfully updated. A failure that may occur before all the new data is written does not corrupt the original file since the association between the LBAs and the physical addresses of the original data is not updated until writing the new data is completed.

When the FS stores a given file in SSD 24 it sometimes also stores one or more backup copies of that file in the SSD. In principle, the FS can manage the association between the LBAs of the original file and the backup copies in the FS information, so that if for some reason the original file becomes corrupted, the FS can read a respective backup copy instead. In an example embodiment, the SSD controller has access to the FS information, and manages LBAs of backup copies transparently to the FS. Thus, if the SSD controller fails to read data from a certain file, the SSD controller (transparently to the FS) accesses the corresponding data in a backup copy of this file, reads the data and provides the file data to the FS.

Figure 3:
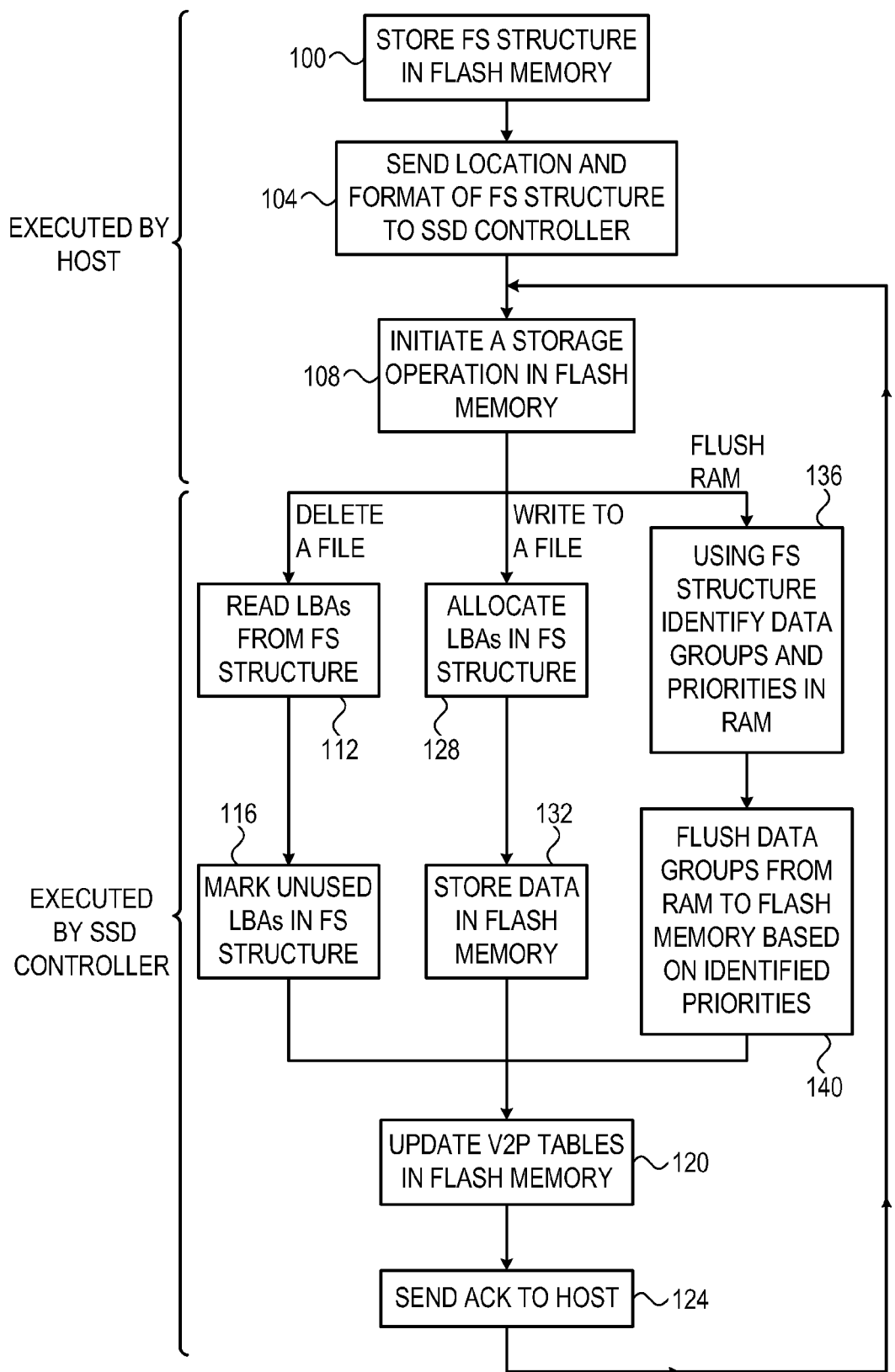
FIGS. 3 and 4 are flow charts that schematically illustrate methods for storage management, in accordance with two embodiments of the present invention.
Figure 4:
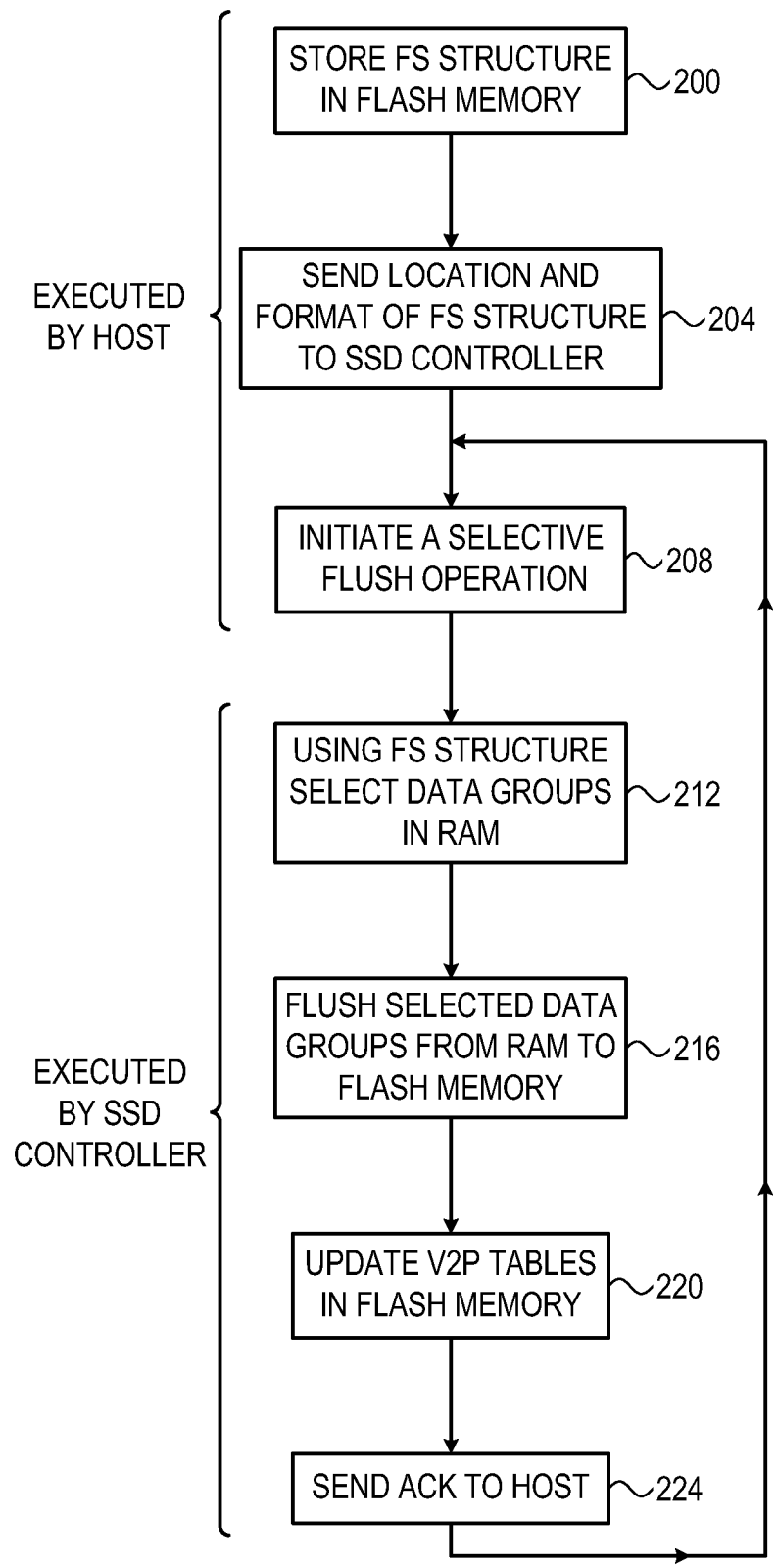

FIGS. 3 and 4 are flow charts that schematically illustrate methods for storage management, in accordance with two embodiments of the present invention. Each of the methods described in FIGS. 3 and 4 is jointly implemented by host 26 and SSD controller 30, wherein the host communicates with the SSD controller via host interface 38.

The method of FIG. 3 begins with host 26 storing a FS data structure of FS 64 in Flash devices 34 at a FS storing step 100. The stored data structure specifies organization of the data in FS 64. In the present example the FS data structure stored at step 100 comprises FS information 76 of FIG. 2. Host 26 sends a granting directive to SSD controller 30 at a granting step 104. The granting directive comprises the location of the data structure in memory, and formatting information to enable the SSD controller to parse the data structure. At some point in time, host 26 initiates a storage operation at an operation initiating step 108. In the present example, host 26 initiates one of three storage operations by sending a respective command to SSD controller 30. The set of possible storage operations comprises deleting a file, writing a new file, and flushing. Since reading a file does not modify FS information 76, this operation is omitted from the description.

Upon receiving a command from host 26, SSD controller 30 parses the previously stored FS data structure to read which LBAs are allocated for that file at a reading LBAs step 112. The DELETE A FILE command comprises a handle to the file which specifies a respective parse starting point in the data structure. SSD controller 30 scans the LBAs read at step 112, and marks these LBAs as unused at a marking LBAs step 116. SSD controller 30 then removes the marked LBAs from FS information 76 and from V2P translation tables 72 at an updating V2P tables step 120. SSD controller 30 informs host 26 that the deletion operation is concluded by sending an acknowledge message at an acknowledging step 124. The method loops back to step 108 in which host 26 initiates another storage operation.

When system 20 stores a new file in SSD 24, host 26 sends a WRITE TO A FILE command to SSD controller 30. The WRITE command may comprise the file data and size. Upon receiving the WRITE TO A FILE command from host 26, SSD controller 30 uses the access capabilities to the FS information (granted by the host) to allocate LBAs, and marks the allocated LBAs as used LBAs in the FS data structure at an LBAs allocation step 128. A WRITE command may refer to writing a new file wherein a new set of LBAs should be allocated, or to updating an already stored file wherein the file LBAs should be re-allocated. SSD controller 30 may use any suitable method for allocating LBAs in the FS data structure. For example, SSD controller 30 may optimally allocate LBAs to minimize fragmentation in either the logical address space, physical address space, or jointly in both as described herein above. SSD controller 30 stores the data file in Flash devices 34 according to the allocated LBAs in a storing in Flash step 132. SSD controller 30 then updates V2P tables 72 to map logical to physical address translations for the newly allocated or re-allocated LBAs at step 120. SSD controller 30 acknowledges host 26 that the write/update file operation is concluded at step 124. The method loops back to step 108 to initiate another storage command by host 26.

Upon receiving a FLUSH RAM command, SSD controller scans RAM 50 to identify cached data groups and respective storage priorities at a data groups identification step 136. SSD controller 30 can use any suitable criterion to identify data groups and priorities. For example, SSD controller 30 can identify cached sections of the FS data structure in RAM 50 as sections having the highest storage priority. SSD controller 30 flushes data groups cached in RAM 50 to Flash devices 34 according to the identified priorities at a flushing step 140. SSD controller 30 updates V2P tables 72 and sends an acknowledge message to host 26 at steps 120 and 124 respectively. SSD controller 30 then loops back to step 108 in which host 26 initiates another storage operation.

The method of FIG. 4 begins with host 26 storing an FS data structure of FS 64 at a FS storing step 200. Host 26 informs SSD controller 30 the location of the FS data structure in memory and formatting information at a granting step 204. Steps 200 and 204 are similar to steps 100 and 104 of FIG. 3 respectively as described above. Host 26 initiates a SELECTIVE FLUSH command at an initiating selective flush operation step 208. The SELECTIVE FLUSH command at step 208 specifies what data is to be flushed, and may comprise handles to one or more files to be flushed from RAM 50 to Flash devices 34. Additionally or alternatively, the SELECTIVE FLUSH command may comprise handles to any suitable data group that can be distinguished using the FS information.

Using the FS data structure SSD controller 30 selects data groups in RAM 50 that comprise the data to be flushed at a selection step 212. SSD controller 30 then flushes the selected data groups (e.g., the files specified in the FLUSH command) to Flash devices 34 at a files flushing step 216. SSD controller 30 updates V2P tables 72 and sends an acknowledge to inform host 26 that the selective flush operation is concluded at steps 220 and 224 similarly to steps 120 and 124 of FIG. 3 above. The method loops back to step 208 in which host 26 initiates another flush operation.

The methods described in FIGS. 3 and 4 above are exemplary methods, and other methods can be used in alternative embodiments. For example, in FIG. 3 storage operation is initiated by host 26 at step 108. In alternative embodiments, SSD controller 30 can initiate storage operations such as re-allocation of logical/physical address space of stored files, or flushing RAM 50.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a non-volatile memory configured to store, in one or more physical storage locations, file system information for a file system managed by an operating system executing on a host processor, wherein the file system information includes validity data indicating which logical block addresses (LBAs) in a logical address space of the file system store valid data; and a storage processor, which is configured to:
receive, from the host processor, permission for the storage processor to modify the validity data of the file system with updated information while performing a set of one or more operations;
modify the validity data with the updated information as part of performing the set of one or more operations, wherein the updated information is generated by the storage processor; and
store the modified validity data in the non-volatile memory.

2. The apparatus according to claim 1, wherein the storage processor is further configured to:
receive, from the host processor, a command to modify the validity data; and
modify the validity data in response to the command.

3. The apparatus according to claim 1, further comprising a volatile memory for caching received data, wherein the received data comprises one or more data groups, and wherein the storage processor is further configured to store the received data by selecting at least one of the one or more data groups using the file system information, and flushing only the selected data groups from the volatile memory to the non-volatile memory.

4. The apparatus according to claim 3, wherein the data groups comprise data related to a specific file, and wherein the storage processor is further configured to select and flush only the received data related to the specific file.

5. The apparatus according to claim 3, wherein the data groups comprise data related to a specific storage command, and wherein the storage processor is further configured to select and flush only the received data related to the specific storage command.

6. The apparatus according to claim 3, wherein at least one of the one or more data groups is assigned a respective storage priority, and wherein the storage processor is further configured to store the received data by identifying, using the file system information, the assigned data groups and the respective storage priorities, and flushing the identified data groups according to the storage priorities.

7. The apparatus according to claim 1, wherein the storage processor is further configured to:
modify the validity data while performing at least one of the set of one or more operations; and
send a conclusion message to the host processor upon concluding to perform each of the set of one or more operations.

8. The apparatus according to claim 1, wherein the storage processor is further configured to store the modified validity data in the non-volatile memory using an Error Correcting Code (ECC).

9. A method, comprising:
receiving, in a storage device, from a host processor, file system information for a file system to be stored in one or more physical storage locations in a non-volatile memory included in the storage device, wherein the file system information is managed by an operating system executing on the host processor, and wherein the file system information includes validity data indicating which Logical Block Addresses (LBAs) in a logical address space of the file system are used for storing valid data;
receiving, in the storage device, from the host processor, permission for the storage device to modify the validity data of the file system with updated information while performing a set of one or more operations;
modifying the validity data with the updated information as part of performing the set of one or more operations, wherein the updated information is generated by the storage device; and
storing the modified validity data in the non-volatile memory.

10. The method according to claim 9, wherein performing the set of one or more operations comprises de-allocating one or more of the LBAs in the logical address space, and modifying the validity data in the file system information to indicate the de-allocated LBAs.

11. The method according to claim 9, wherein the storage device comprises a volatile memory for caching received data, wherein the received data comprises one or more data groups, and wherein managing storage of the received data comprises selecting at least one of the one or more data groups using the file system information, and flushing only the selected data groups from the volatile memory to the non-volatile memory.

12. The method according to claim 11, wherein the data groups comprise data related to a specific file, and wherein managing the storage of the received data comprises selecting and flushing only the received data related to the specific file.

13. The method according to claim 11, wherein the data groups comprise data related to a specific storage command, and wherein managing the storage of the received data comprises selecting and flushing only the received data related to the specific storage command.

14. The method according to claim 11, wherein at least one of the one or more data groups is assigned a respective storage priority, and wherein managing the storage of the received data comprises identifying, using the file system information, the assigned data groups and the respective storage priorities, and flushing the identified data groups according to the storage priorities.

15. The method according to claim 9, further comprising modifying the validity data while performing at least one of the set of one or more operations, and sending a conclusion message to the host processor upon concluding to perform each of the set of one or more operations.

16. An apparatus, comprising:
a host processor configured to run an operating system, wherein the operating system manages a file system, including file system information, for storing data, and wherein the file system information includes validity data indicating which logical block addresses (LBAs) in a logical address space of the file system store valid data; and
a storage device, including a non-volatile memory, wherein the storage device is configured to:
receive, from the host processor, the file system information for storage in the non-volatile memory;
receive, from the host processor, permission for the storage device to modify the validity data of the file system with updated information while performing a set of one or more operations;
modify the validity data with the updated information as part of performing the set of one or more operations, wherein the updated information is generated by the storage device; and
store the modified validity data in the non-volatile memory.

17. The apparatus according to claim 16, further comprising a volatile memory for caching received data, wherein the received data comprises one or more data groups, and wherein the storage device is further configured to store the received data by selecting at least one of the one or more data groups using the file system information, and flushing only the selected data groups from the volatile memory to the non-volatile memory.

18. The apparatus according to claim 17, wherein the data groups comprise data related to a specific file, and wherein the storage device is further configured to select and flush only the received data related to the specific file.

19. The apparatus according to claim 17, wherein the data groups comprise data related to a specific storage command, and wherein the storage device is further configured to select and flush only the received data related to the specific storage command.

20. The apparatus according to claim 17, wherein at least one of the one or more data groups is assigned a respective storage priority, and wherein the storage device is further configured to store the received data by identifying, using the file system information, the assigned data groups and the respective storage priorities, and flushing the identified data groups according to the storage priorities.

* * * * *